DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 3, 1973

909 O.G. 6

T909,007
PREPARATION OF FILM VIA A TUBULAR PROCESS

Paul E. Holloway, Jr., New Castle, Del., assignor to Hercules Incorporated, Wilmington, Del.

Filed June 6, 1972, Ser. No. 260,228
Int. Cl. B29c *5/05, 23/00;* B29d *7/22*
U.S. Cl. 264—95
1 Sheet Drawing. 6 Pages Specification

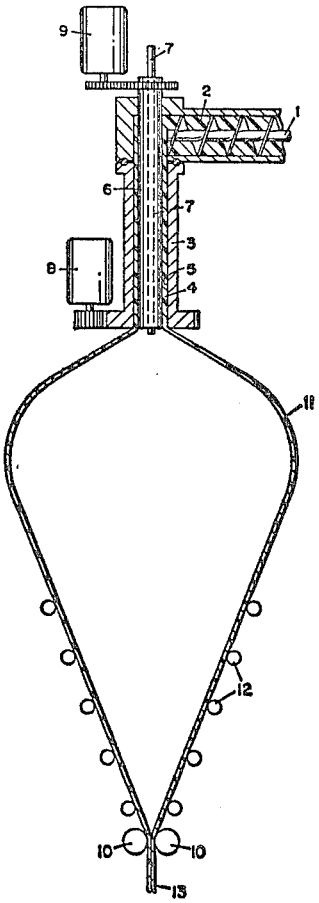

An improved method of preparing films of highly viscous hydroxypropyl cellulose to minimize the effect of friction-induced longitudinal orientation on later balancing of longitudinal and transverse orientation is disclosed. The technique comprises subjecting the film to a transverse frictional drag during extrusion by extruding the polymer thru a tubular die having rotatable forming surfaces, i.e. die body and mandrel. The rate of rotation can be varied to effect a substantially balanced degree of friction-induced orientation or a preponderance of orientation in the circumferential direction. An ancillary benefit is that the rotation substantially wipes out weld lines formed by the polymer flowing around the mandrel support.

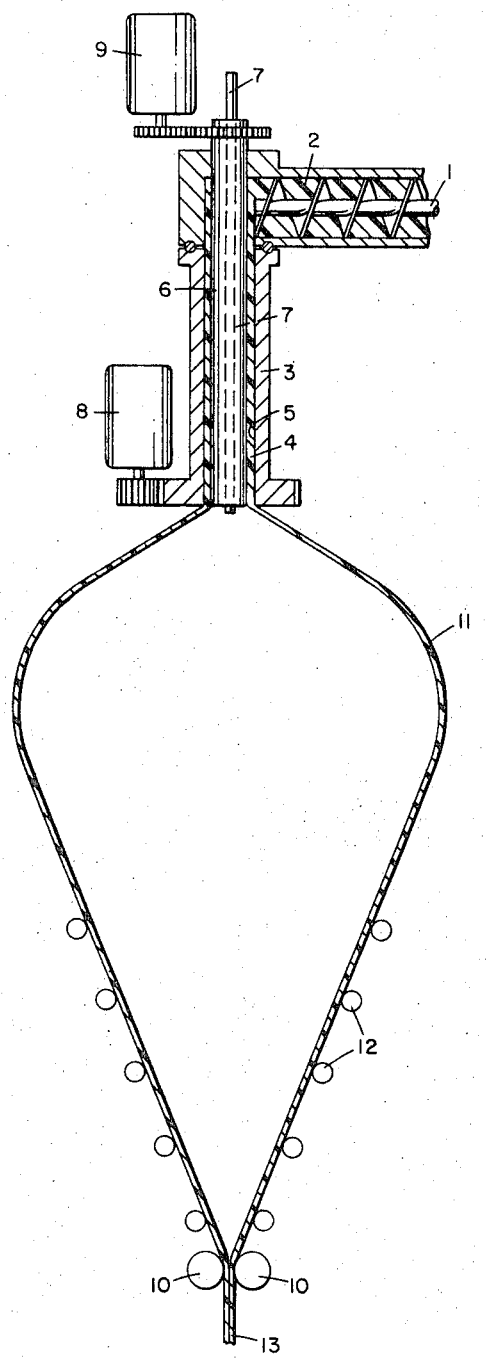

April 3, 1973 P. E. HOLLOWAY, JR T909,007
PREPARATION OF FILM VIA A TUBULAR PROCESS
Filed June 6, 1972